United States Patent [19]

Grieder et al.

[11] Patent Number: 4,776,405

[45] Date of Patent: Oct. 11, 1988

[54] ROTARY DRIVEN CULTIVATOR WITH SUPPORT ARM BETWEEN CLUTCH CASING AND GEAR BOX

[75] Inventors: C. Austin Grieder, Des Moines; David G. Stephenson, Urbandale; John R. Durfee, Ankeny, all of Iowa

[73] Assignee: Western International, Inc., Des Moines, Iowa

[21] Appl. No.: 54,393

[22] Filed: May 26, 1987

[51] Int. Cl.⁴ .................. A01B 33/00; B62D 51/04
[52] U.S. Cl. ...................................... 172/42; 180/19.1
[58] Field of Search .......................... 172/41, 42, 43; 180/19.1, 19.2, 19.3

[56] References Cited

U.S. PATENT DOCUMENTS 4,214,632  7/1980  Brookshier .......................... 172/42
4,354,564  10/1982  Watanabe et al. ................. 180/19.1

FOREIGN PATENT DOCUMENTS 886573  1/1962  United Kingdom ............... 180/19.1

Primary Examiner—Richard T. Stouffer
Attorney, Agent, or Firm—G. Brian Pingel; Kent A. Herink

[57] ABSTRACT

An improved rotary cultivator includes a prime mover, a gear box and rotary driven tines. An engine mount casing is located between the prime mover and the gear box and is employed in securing such components together in an operative unitary fashion.

8 Claims, 6 Drawing Sheets

ROTARY DRIVEN CULTIVATOR WITH SUPPORT ARM BETWEEN CLUTCH CASING AND GEAR BOX

BACKGROUND OF THE INVENTION

1. Field of the Invention

The present invention relates in general to agricultural cultivators with rotary driven tines, and more specifically to light weight cultivators designed for simplified handling and maneuverability.

2. Description of Related Art

A wide variety of rotary driven garden cultivators are known in the art. Such cultivators are particularly useful for breaking up small plots of ground prior to spring planting, and they normally have an inclined pair of control handles for a user that walks behind them.

The present invention provides an improved rotary driven cultivator that is light weight and is particularly designed to provide efficiencies in manufacture and assembly.

SUMMARY OF THE INVENTION

The present invention provides an improved rotary driven cultivator having a prime mover for powering the cultivator, a plurality of ground engaging tines mounted on a rotatable horizontal shaft, means for driving said rotatable shaft and a casing means that is utilized in securing the prime mover to said drive means.

A clutch means is located near the bottom portion of the prime mover and the casing means encloses said clutch means. The drive means includes a gear box and a drive shaft that extends between the gear box and a lower portion of the clutch means to provide rotary power to the tines. Support means are extended between and secured to the casing means and the gear box to form a rigid connection there between and maintain such components in a fixed relationship to one another.

In a preferred embodiment, the casing means is formed with curved side portions for receiving the lower end portions of a handle used for controlling the cultivator. In this way, such lower end portions are securely attached to said casing means in a supported fashion to prevent damage thereto or to the user.

DESCRIPTION OF THE PREFERRED EMBODIMENT

Figure 1:
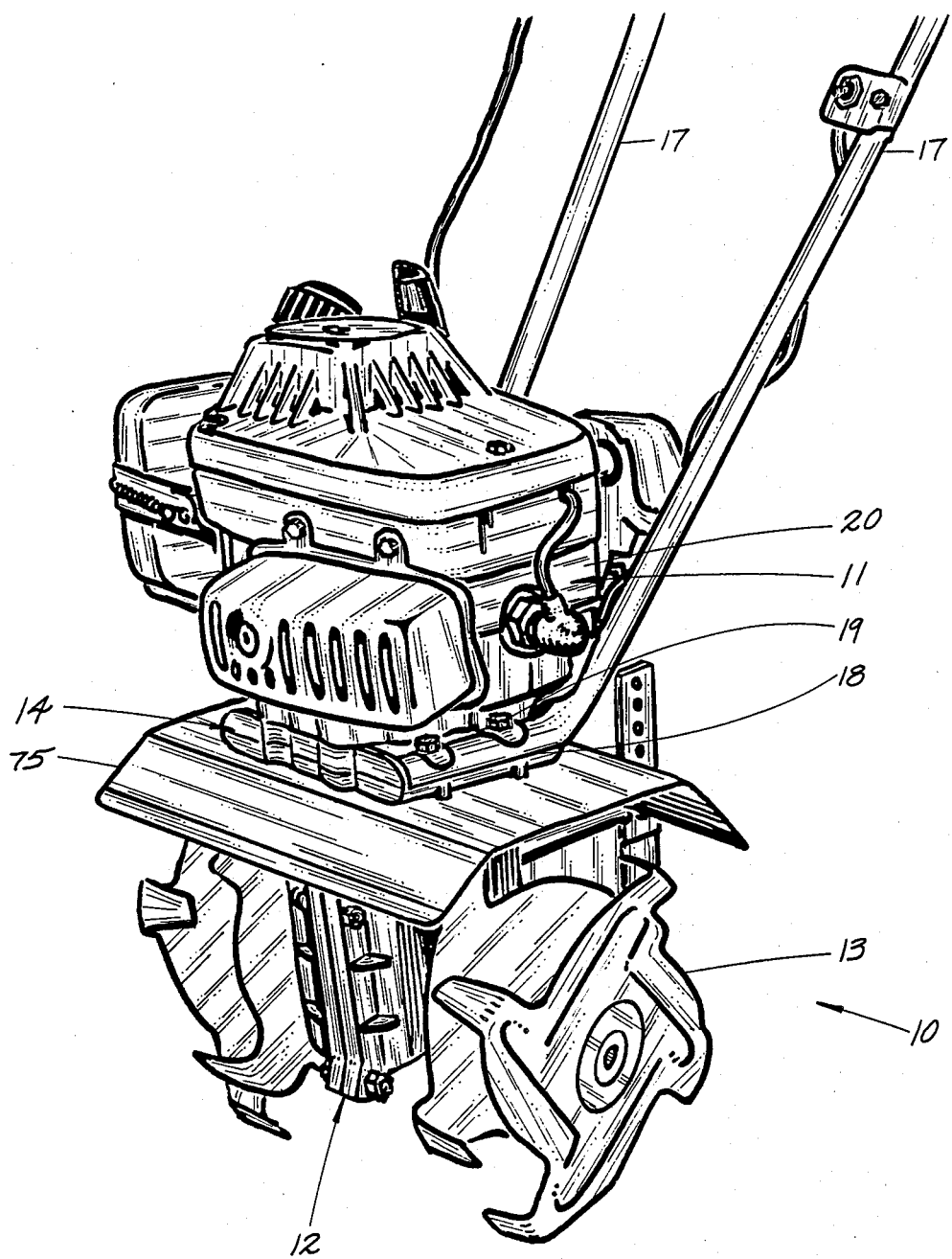
FIG. 1 is a front-side perspective view of a preferred embodiment of an improved cultivator of the present invention.

Referring now to the drawings and with reference first to FIG. 1, a front-side perspective of a preferred embodiment of the Improved Cultivator of the present invention is shown at 10. The cultivator 10 includes engine 11 that serves as a prime mover, a drive means 12 for driving a plurality of ground engaging tines 13 and a casing means 14 employed to serve as a connecting member between the drive means 12 and the engine 11. Also included in the cultivator 10 is a pair of upwardly inclined handles 17 (only lower portions shown) having lower bent ends 18 secured to the casing means 14 as by bolts 19. The handles 17 are employed by control and direct the cultivator 10.

The engine 11 is preferably gasoline fueled or can be an electric motor and sits on top the casing member 14. The engine 11 has a housing 20 with a necked down lower portion 21 (FIGS. 2 and 3) into which an engine stub shaft 22 downwardly extends as shown only in FIG. 3. The housing lower portion 21 is of a specific configuration to correspond to the casing means 14.

Referring now to FIGS. 4–10, the casing means 14 has a unique configuration that includes a relatively flat platform portion 23 with an upstanding cup shaped portion 24 generally centrally disposed. The front portion of the means 14 is formed by an upstanding wall 25 that is generally orthogonal to the platform 23. The rear portion of the means 14 is formed of a ledge 26 that is parallel with the platform portion 23 but is lowered therefrom and terminates in a triangularly shaped downwardly extending flap 27.

Figure 10:
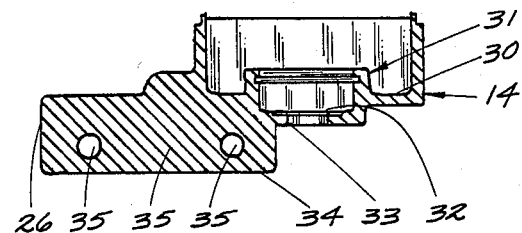
FIG. 10 is a section view of the casing member of FIG. 4 taken along the line 10—10 in FIG. 9.
Figure 9:
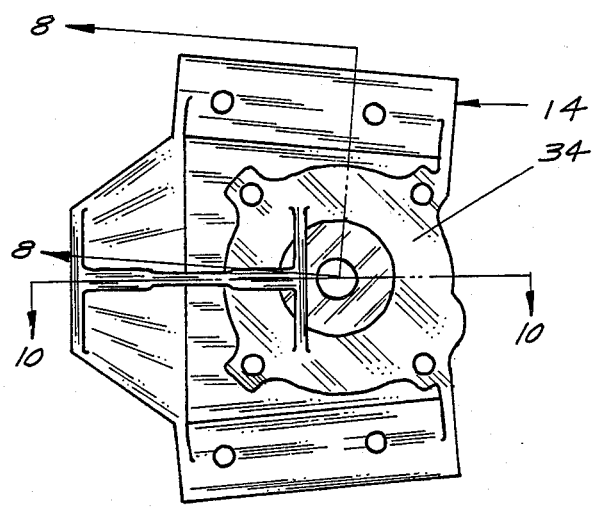
FIG. 9 is a bottom view of the casing member of FIG. 4.

On each side of the platform 23 are longitudinally extended diverging troughs 28 that are aligned on a slight angle with respect to the cup portion 24. Thus, the front ends of the troughs 27 are spaced closer together than are the rear ends. Formed as part of the cup shaped portion 24 are four spaced apart mounting abutments 29 having longitudinal throughbores 29a. As best shown in FIGS. 4 and 10, the cup shaped portion 24 of the casing means 14 has a bottom wall 30 with a central socket shaped portion 31 having its own bottom wall 32 with a central aperture 33 for a purpose to be described below. Also, located on a bottom side 34 of the member 14 is a rib 35 (FIGS. 3 and 10) that extends from the flap 27 to the socket bottom wall 32. The rib 35 has two mounting holes horizontally aligned.

Figure 3:
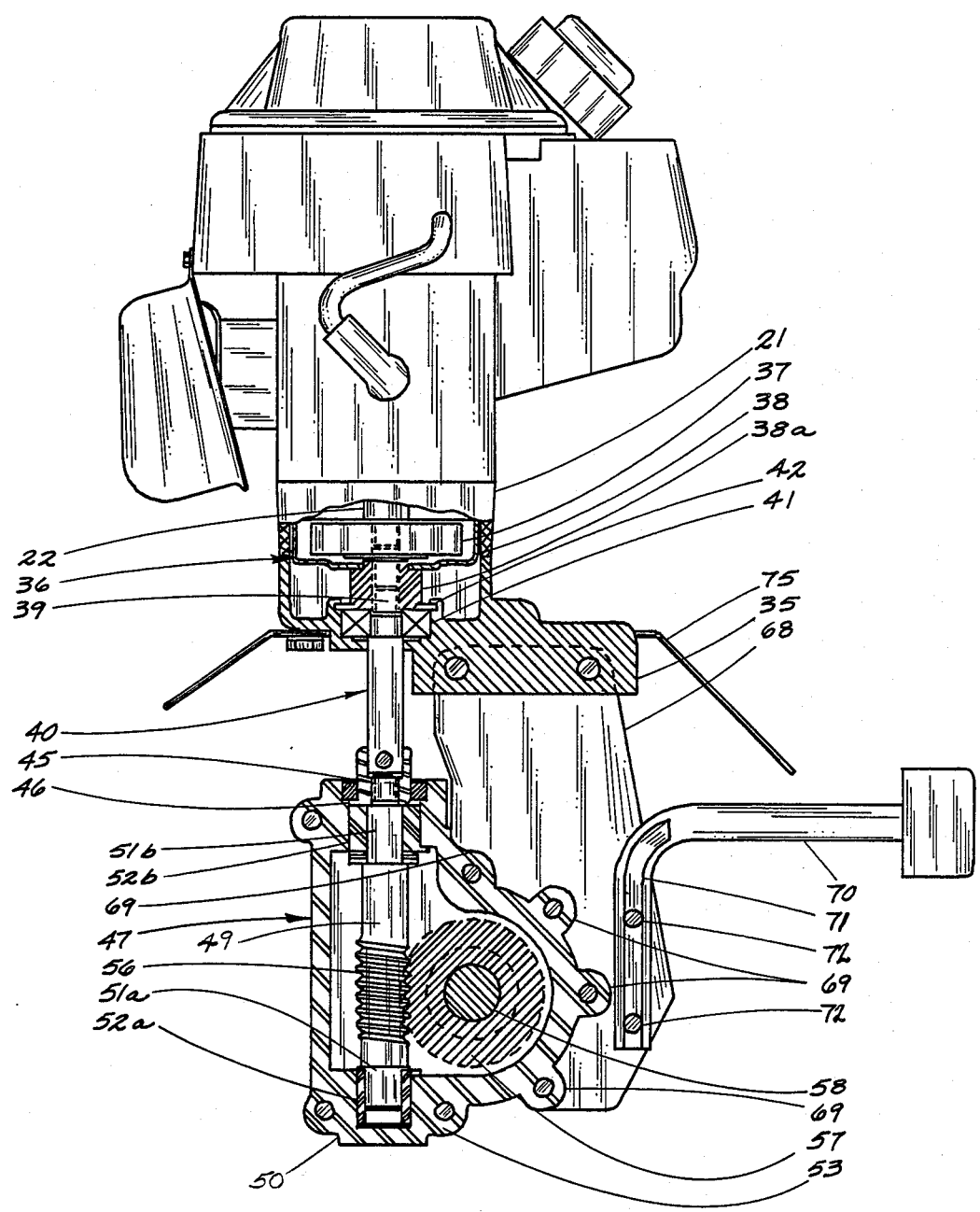
FIG. 3 is a side view in elevation of the cultivator of FIG. 1 with the lower portion of said embodiment sectioned along the line 3—3 of FIG. 2.
Figure 4:
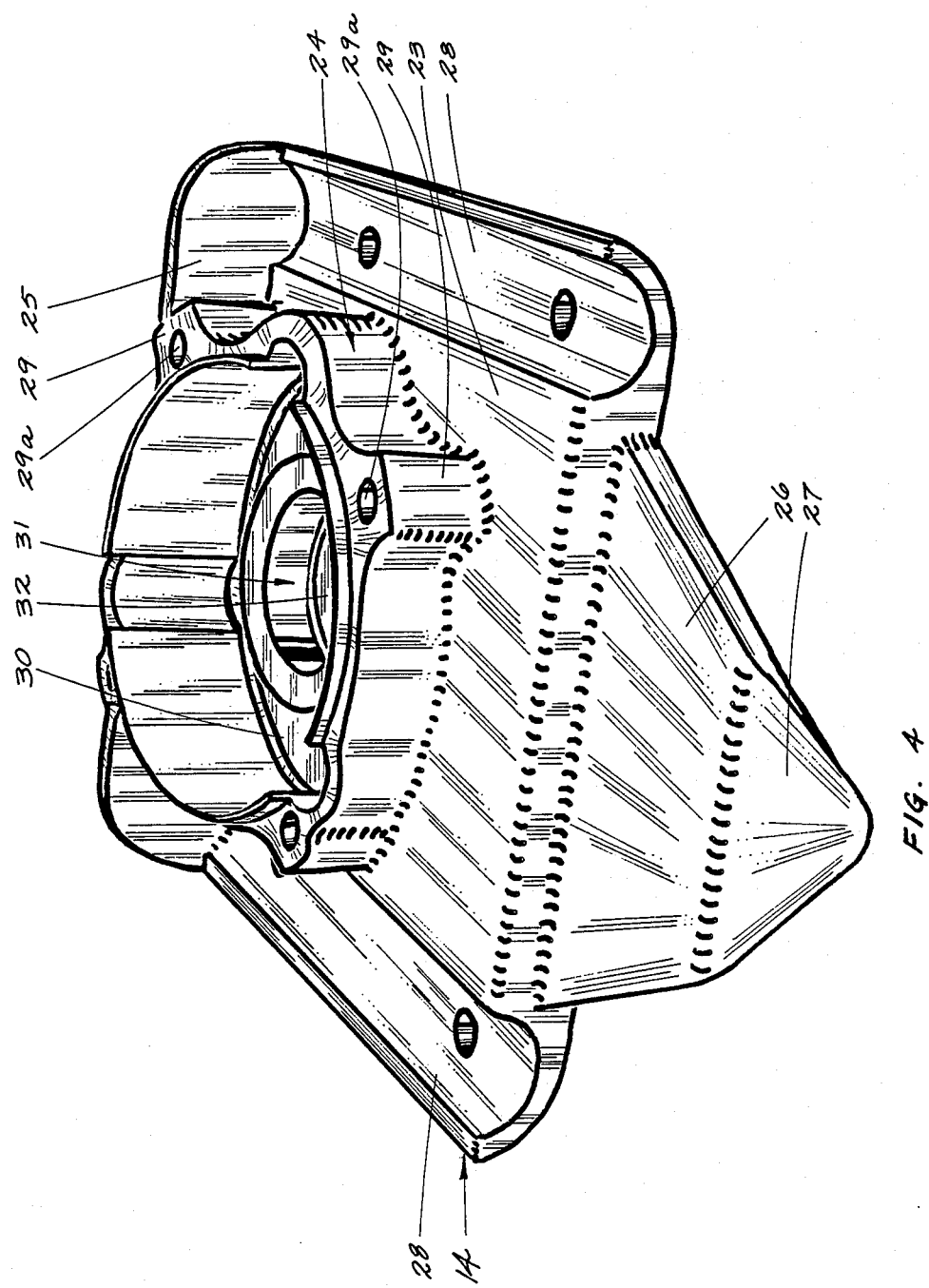
FIG. 4 is a rear perspective view of a casing member utilized in the cultivator of FIG. 1.
Figure 5:
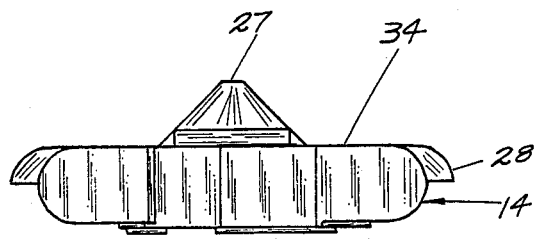
FIG. 5 is an inverted front view in elevation of the casing member of FIG. 4.
Figure 8:
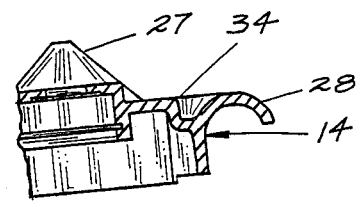
FIG. 8 is a partial section view of the casing member of FIG. 4 taken along the line 8—8 of FIG. 9.
Figure 6:
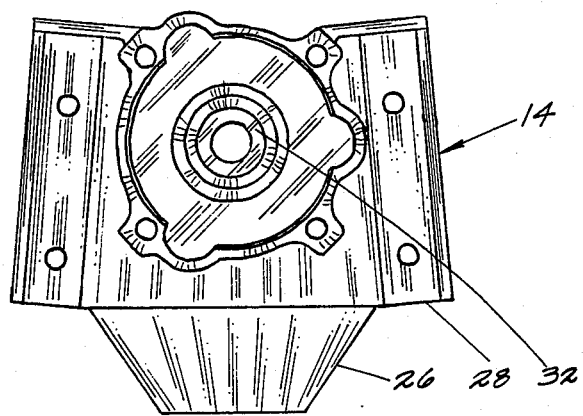
FIG. 6 is a plan view of the casing member of FIG. 4.
Figure 7:
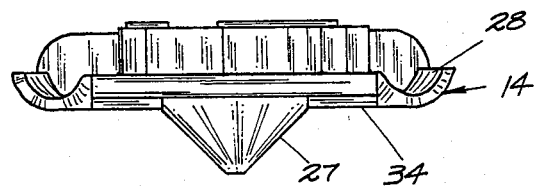
FIG. 7 is a rear view of the casing member of FIG. 4.

As best shown in FIG. 3, the cup shaped portion 24 of the casing means 14 conforms to the necked down portion 21 of the engine housing 20 and is attachable thereto by bolts positioned in the throughbores 29a. Consequently, together the portions 20 and 24 form an enclosure for a centrifugal clutch 36. Comprising the clutch 36 is a rotor 37 affixed to the lower end of the engine stub shaft 22 and disposed in a drum member 38 as is well known in the art. The drum member 38 has a lower coupling portion 38a that receives an upper end 39 of a drive shaft 40 extending through the aperture 33 of the casing member 14. A bearing 41, that is preferably a ball bearing, is disposed in the socket 31 and is held therein by a snap ring 42 to provide transverse support for the upper end of the drive shaft 39. A lower end 45 of the drive shaft 39 is hexagonally shaped and is received in the upper portion of a correspondingly shaped coupling member 46 rotatably secured in the top of a gear box 47. Together, the gear box 47 and its associate elements and the drive shaft 39 form the drive means 12.

The coupling member 46 serves to couple the lower end 45 of the drive shaft 39 with an upper end 48 of a vertically aligned worm shaft 49 enclosed within a housing 50 for the gear box 47. A lower end 51a of the worm shaft 49 is journaled in a bushing 52a secured in a sidewall 53 of the housing 50 and an upper end 51b of the shaft 49 is journaled in a bushing 52b disposed in an upper portion of the housing 50. Located approximately medially of the ends 48 and 51 on the shaft 49 is a worm 56 that is in meshing engagement with a worm gear 57 mounted on a horizontally oriented rotatable tine shaft 58, as shown in FIGS. 2 and 3.

Figure 2:
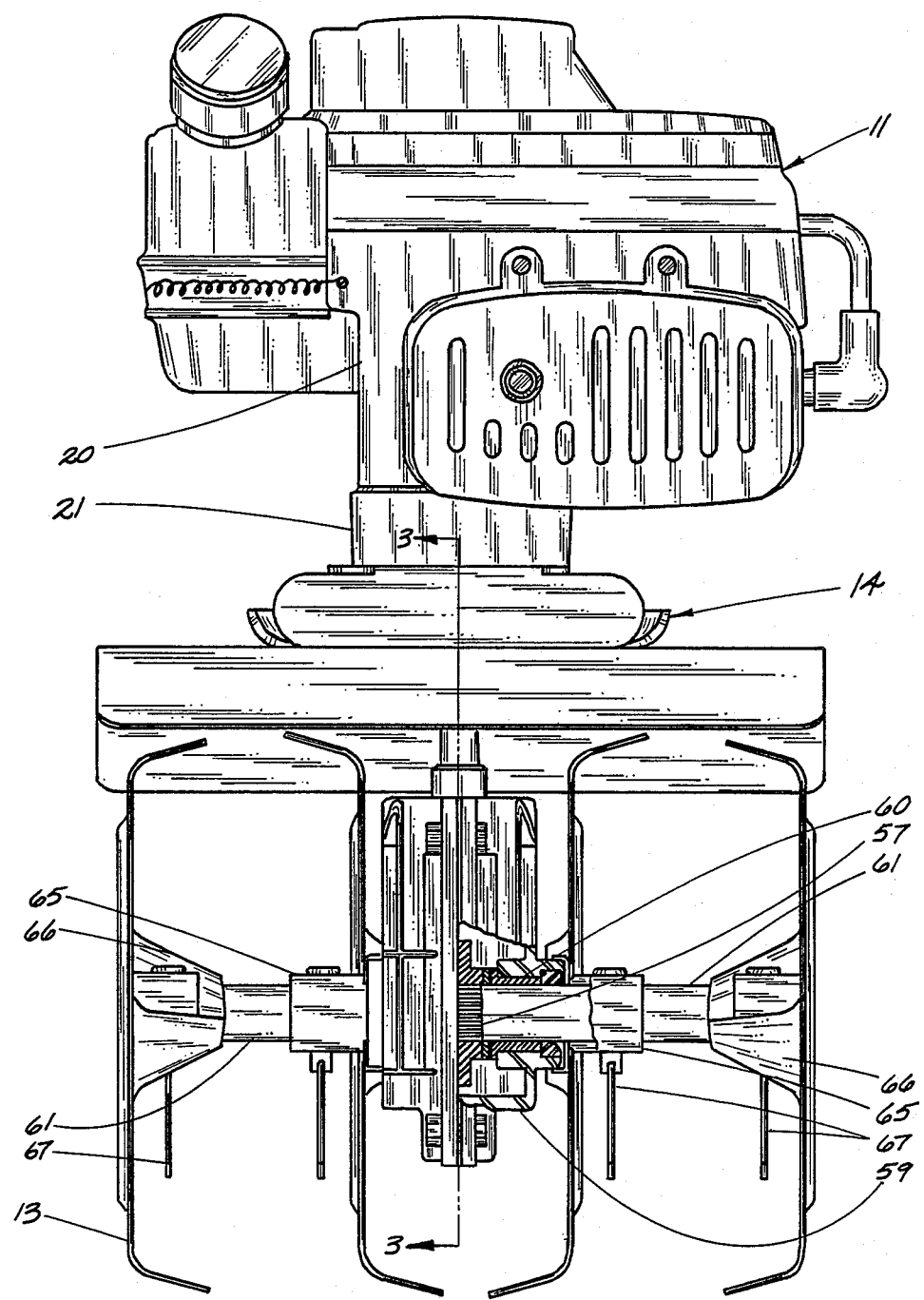
FIG. 2 is a front view in elevation of the cultivator of FIG. 1 with portions cut away to expose interior components and with the handles removed.

Referring to FIG. 2, it can be seen that the tine shaft 58 is journaled in association with end walls 59 of the gear box housing 50 by means of bushings 60. The tine shaft 58 has outer end portions 61 on which ground engaging tines 65 and 66 are attached by means of cotter pins 67 or the like. Accordingly, the tines are translated in a rotary motion in correspondence to the driving force provided by a drive train formed of the tine shaft 58, the worm shaft 49, the drive shaft 39, and the centrifugal clutch 36. It should be noted that the outer ends or cutting members of the tines 66 are both turned inward to avoid their catching plants during cultivation.

Referring now to FIG. 3, to secure the gear box 47 in a fixed relationship to the engine 11, there are two parallel support arms 68 (only one of which is shown in FIG. 3) that are attached by bolts at their upper ends to the rib 35 of the case 14 and at their lower portions to ears 69 protruding from the rear periphery of the gear box 47. The support arms 68 are formed of strengthened metal plates to insure that there is little if any undesired limit of movement between the gear box 47 and the engine 11.

The plates 68 also serve as a rigid attachment means for a depth bar handle 70 that has an end 71 wedged between the two support arms 68 and secured thereto by bolts 72. Generally horizontally disposed tine shield 75 lies adjacent the bottom side of the casing member 14 and is attached thereto by the same bolts 19 that attach the handle to such member.

Thus, it can be seen that the casing member 14 serves multiple functions in assisting in the formation of the cultivator 10 as an operatively integral unit and does so in a fashion that provides for reduced manufacturing and assembly expenses.

I claim:

1. An improved rotary driven cultivator comprising:
   (a) a prime mover for powering said cultivator;
   (b) prime mover clutch means located near the bottom portion of said prime mover;
   (c) a horizontal rotatable tine shaft;
   (d) a plurality of ground engaging tines secured on said tine shaft;
   (e) drive means for driving said tine shaft and including:
      (1) a gear box; and
      (2) a vertical drive shaft extended between said gear box and said clutch means;
   (f) casing means enclosing said clutch means and having a bottom opening through which the upper end of said drive shaft protrudes to engage said clutch means;
   (g) at least one support arm with its forward end positioned to the rear of said drive shaft and extended between and semi-permanently secured to a rear portion of said casing means and a rear portion of said gear box to form a rigid connection there between;
   (h) said clutch means forms a releasable coupling means between said prime mover and said drive shaft when said cultivator is placed in an operating position; and
   (i) handle means with a top and a bottom end for control of said cultivator by a user, said bottom end of said handle means attached to said casing means and extending forwardly of said at least one support arm.

2. An improved cultivator as described in claim 1 wherein said casing means is formed with at least one trough shaped portion that conforms to the shape of the bottom end of said handle means for receiving said bottom end of said handle means and serving as a positioning guide for same.

3. An improved cultivator as recited in claim 2 wherein said casing means serves to close off the bottom end of said handle means and there are at least two of said support arms that are formed of strengthened plates and are positioned parallel to one another.

4. An improved cultivator as recited in claim 3 wherein a bearing is secured to said casing means for absorbing end thrust on said drive shaft.

5. An improved cultivator as recited in claim 3 wherein a tine shield is secured to said casing means.

6. An improved cultivator as recited in claim 3 wherein a depth bar bracket is mounted from said support means.

7. An improved cultivator as recited in claim 3 wherein said casing means has a pair of spaced apart trough shaped portions for receiving said bottom end of said handle means, a cup shaped portion for receiving said clutch means and is secured to the bottom portion of said prime mover.

8. An improved cultivator as recited in claim 3 wherein said ground engaging tines include an inner set and an outer set of tines, and said tines of said outer set have end portions turned inwardly to prevent damage to crops during operation of said cultivator.

* * * * *